(12) United States Patent
Sugimoto

(10) Patent No.: US 8,120,808 B2
(45) Date of Patent: Feb. 21, 2012

(54) APPARATUS, METHOD, AND PROGRAM FOR LAYING OUT IMAGES

(75) Inventor: Mika Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 987 days.

(21) Appl. No.: 11/542,194

(22) Filed: Oct. 4, 2006

(65) Prior Publication Data

US 2007/0030520 A1 Feb. 8, 2007

(30) Foreign Application Priority Data

Oct. 5, 2005 (JP) .................................. 2005-291993

(51) Int. Cl.
*G06K 15/00* (2006.01)
*G06K 9/00* (2006.01)
*G06K 9/36* (2006.01)
*G06K 9/60* (2006.01)
*G06T 5/00* (2006.01)

(52) U.S. Cl. ...... 358/1.18; 358/3.26; 382/118; 382/284; 382/276; 382/308

(58) Field of Classification Search .................. 358/1.18; 382/118
See application file for complete search history.

(56) References Cited

U.S. PATENT DOCUMENTS

| | | | |
|---|---|---|---|
| 6,792,135 B1 * | 9/2004 | Toyama | 382/118 |
| 7,006,671 B2 * | 2/2006 | Yamaguchi | 382/115 |
| 7,123,754 B2 * | 10/2006 | Matsuo et al. | 382/118 |
| 7,269,292 B2 * | 9/2007 | Steinberg | 382/243 |
| 7,580,587 B2 * | 8/2009 | Matsugu et al. | 382/274 |
| 7,620,218 B2 * | 11/2009 | Steinberg et al. | 382/118 |
| 7,630,527 B2 * | 12/2009 | Steinberg et al. | 382/118 |
| 7,634,138 B2 * | 12/2009 | White et al. | 382/209 |
| 2003/0169343 A1 * | 9/2003 | Kagaya et al. | 348/207.1 |
| 2003/0174869 A1 * | 9/2003 | Suarez | 382/118 |
| 2004/0120009 A1 * | 6/2004 | White et al. | 358/1.18 |
| 2005/0134933 A1 * | 6/2005 | Tsue et al. | 358/437 |
| 2005/0168779 A1 * | 8/2005 | Tsue et al. | 358/1.18 |
| 2005/0220348 A1 * | 10/2005 | Chiu et al. | 382/194 |
| 2006/0008173 A1 * | 1/2006 | Matsugu et al. | 382/274 |
| 2006/0056668 A1 | 3/2006 | Ozaki | |
| 2006/0109510 A1 * | 5/2006 | Widdowson et al. | 358/1.18 |
| 2006/0204053 A1 * | 9/2006 | Mori et al. | 382/118 |

FOREIGN PATENT DOCUMENTS

| | | |
|---|---|---|
| JP | 11-341272 A | 12/1999 |
| JP | 2000-165948 A | 6/2000 |
| JP | 2000-270198 A | 9/2000 |
| JP | 2000-270199 A | 9/2000 |
| WO | WO-00/38414 A1 | 6/2000 |

* cited by examiner

*Primary Examiner* — Hilina S Kassa
(74) *Attorney, Agent, or Firm* — Birch, Stewart, Kolasch & Birch, LLP

(57) ABSTRACT

A user decides images to be laid out on one image. For each image showing presence of face among the decided images, a region decision means decides a display region including at least one face in the corresponding image, according to the number of faces therein and according to a distance between the faces in the case where the number of the faces is larger than 1. A layout image generation unit extracts the display regions from the respective images, and generates a layout image by laying out the extracted display regions on a background image.

11 Claims, 5 Drawing Sheets

APPARATUS, METHOD, AND PROGRAM FOR LAYING OUT IMAGES

BACKGROUND OF THE INVENTION

1. Field of the Invention

The present invention relates to an image layout apparatus and an image layout method for laying out a plurality of images on one background image. The present invention also relates to a program that causes a computer to execute the image layout method.

2. Description of the Related Art

In images including people, positions of the people are highly important. Especially, in identification photographs used for passports or the like, faces in predetermined sizes need to be positioned at predetermined positions in images of predetermined sizes. Therefore, methods have been proposed wherein a face is extracted from an image and the extracted face is resized and trimmed so as to have a predetermined size and to be positioned at a predetermined position (see Japanese Unexamined Patent Publication Nos. 11(1999)-341272, 2000-270198, and 2000-270199).

Furthermore, another method has been proposed for the case where images of people are laid out in each page as in a school yearbook or the like (see Japanese Unexamined Patent Publication No. 2000-165648). In this method, face regions extracted from images obtained by photography of respective persons are normalized and a photograph album is generated by pasting the face regions having been subjected to the normalization. According to this method, respective faces in the album have the same size. Consequently, the album can be generated to look fine.

In the case of images obtained by ordinary photography such as in a trip or athletics meet, the respective images may include a plurality of persons. In this case, each of the persons may be normalized and trimmed. However, if each of the persons is normalized and trimmed, the atmosphere at the time of photography represented in the images is greatly ruined.

SUMMARY OF THE INVENTION

The present invention has been conceived based on consideration of the above circumstances. An object of the present invention is therefore to lay out images appropriately according to the number of people (that is, the number of faces) in each of the images.

An image layout apparatus of the present invention comprises:

image decision means for deciding a plurality of images to be laid out on one background image;

a region decision means for judging presence of face in each of the images and for deciding a display region of a predetermined range including at least one face for each image showing the presence of face among the images according to the number of faces therein and according to a distance between the faces in the case where the number of the faces is larger than 1; and layout image generation means for extracting the decided display regions from the corresponding images and for generating a layout image by laying out the extracted display regions on the background image.

In the image layout apparatus of the present invention, in the case where the background image has a plurality of image insertion regions of various sizes and shapes, the layout image generation means may generate the layout image through manipulation of the display regions according to the sizes and the shapes of the corresponding image insertion regions in which the images are inserted.

In the image layout apparatus of the present invention, the region decision means may decide the entirety of each image not showing the presence of face among the images as the display region.

Furthermore, in the image layout apparatus of the present invention, the region decision means may decide the entirety of an image showing the presence of face among the images as the display region in the case where the number of the faces therein is a predetermined number or larger.

In the case where the number of the faces is 1 for an image showing the presence of face among the images, the region decision means in the image layout apparatus of the present invention may decide a region including the face and appropriate for an aspect ratio of a corresponding one of the image insertion regions in the background image as the display region.

In the case where the number of the faces is between 2 and a predetermined number for an image showing the presence of face among the images, the region decision means in the image layout apparatus of the present invention may decide the largest face as a representative face. In this case, the region decision means carries out judgment as to whether a distance between a center of the representative face and a center of the face farthest from the representative face is within a predetermined number of times a width of the representative face, and decides a region including all the faces and appropriate for an aspect ratio of a corresponding one of the image insertion regions in the background image as the display region in the case where a result of the judgment is affirmative.

In the case where the result of the judgment is negative, the region decision means in the image layout apparatus decides the entirety of the image as the display region.

An image layout method of the present invention comprises the steps of:

deciding a plurality of images to be laid out on one background image;

judging presence of face in each of the images and deciding a display region of a predetermined range including at least one face for each image showing the presence of face among the images according to the number of faces therein and according to a distance between the faces in the case where the number of the faces is larger than 1; and extracting the decided display region from the corresponding images and generating a layout image by laying out the extracted display regions on the background image.

The image layout method of the present invention may be provided as a program that causes a computer to execute the image layout method.

According to the present invention, the images to be laid out on the background image are decided, and whether a face or faces is/are included in each of the images is then judged. For each of the images showing the presence of face, the display region of the predetermined range including at least one face therein is decided according to the number of faces therein and according to the distance between the faces in the case where the number of the faces is larger than 1. The decided display region is extracted from the corresponding one of the images showing the presence of face, and the display regions are laid out on the background image for generation of the layout image. Therefore, the display region can be extracted according to the number of faces in the corresponding image, and the layout image can be obtained in a state where the images are appropriately laid out according to the number of faces.

In the case where the background image has the image insertion regions of the various sizes and shapes, the layout image can be generated through manipulation of the display regions according to the sizes and the shapes of the corresponding image insertion regions. In this manner, the layout image that is easy to see can be generated.

DESCRIPTION OF THE PREFERRED EMBODIMENT

Figure 1:
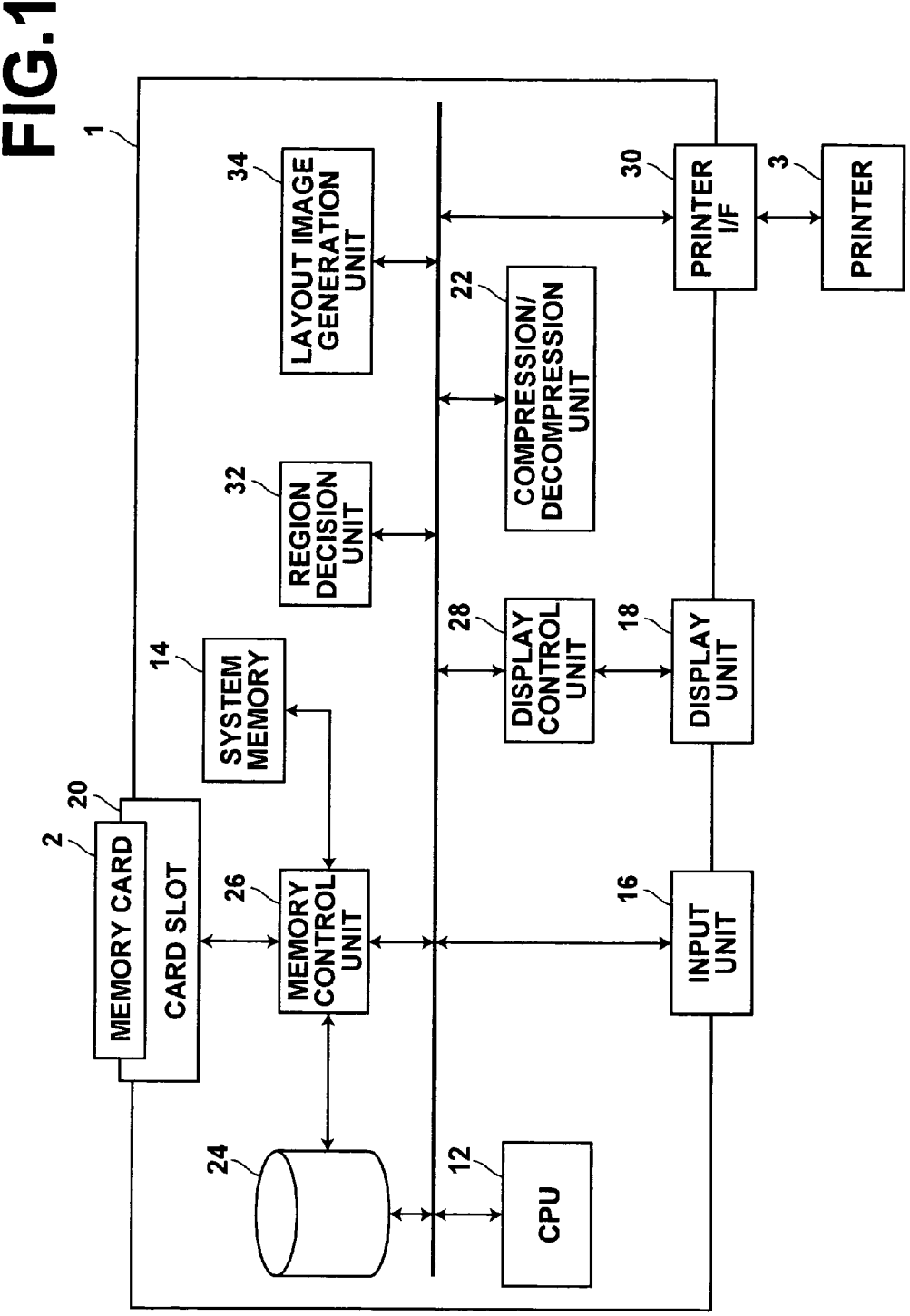
FIG. 1 is a block diagram showing the configuration of an image layout apparatus of an embodiment of the present invention.

Hereinafter, an embodiment of the present invention is described with reference to the accompanying drawings. FIG. 1 is a block diagram showing the configuration of an image layout apparatus of the embodiment of the present invention. As shown in FIG. 1, an image layout apparatus 1 in this embodiment comprises a CPU 12, a system memory 14, an input unit 16, and a display unit 18. The CPU 12 carries out various kinds of control such as recording control of image data representing images and display control. The CPU 12 also controls each of units comprising the apparatus 1. The system memory 14 comprises a ROM storing a basic program for operating the apparatus 1 and various kinds of constants, and a RAM used as a workspace by the CPU 12. The input unit 16 comprises a keyboard and a mouse used for inputting various kinds of instructions to the apparatus 1. The display unit 18 comprises a liquid crystal monitor or the like used for various kinds of display.

The image layout apparatus 1 also comprises a card slot 20, a compression/decompression unit 22, a hard disc 24, a memory control unit 26, a display control unit 28, and a printer interface 30. The card slot 20 is used for reading image data from a memory card 2 and for recording image data in a memory card 2. The compression/decompression unit 22 compresses image data according to a format such as JPEG, and decompresses compressed image data. The hard disc 24 stores the image data read from the memory card 2, template data representing a template used as a background at the time of image layout, and various kinds of programs executed by the CPU 12 such as viewer software for image viewing. The memory control unit 26 controls the system memory 14, the card slot 20, and the hard disc 24. The display control unit 28 controls display on the display unit 18. The printer interface 30 is used for connecting a printer 3 to the apparatus 1.

The image layout apparatus 1 further comprises a region decision means 32 for deciding display regions of images to be laid out and a layout image generation unit 34 for extracting the decided display regions from the images and for generating a layout image by laying out images of the extracted display regions.

Functions of the region decision means 32 and the layout image generation unit 34 are described with procedures carried out in the embodiment.

Figure 2:
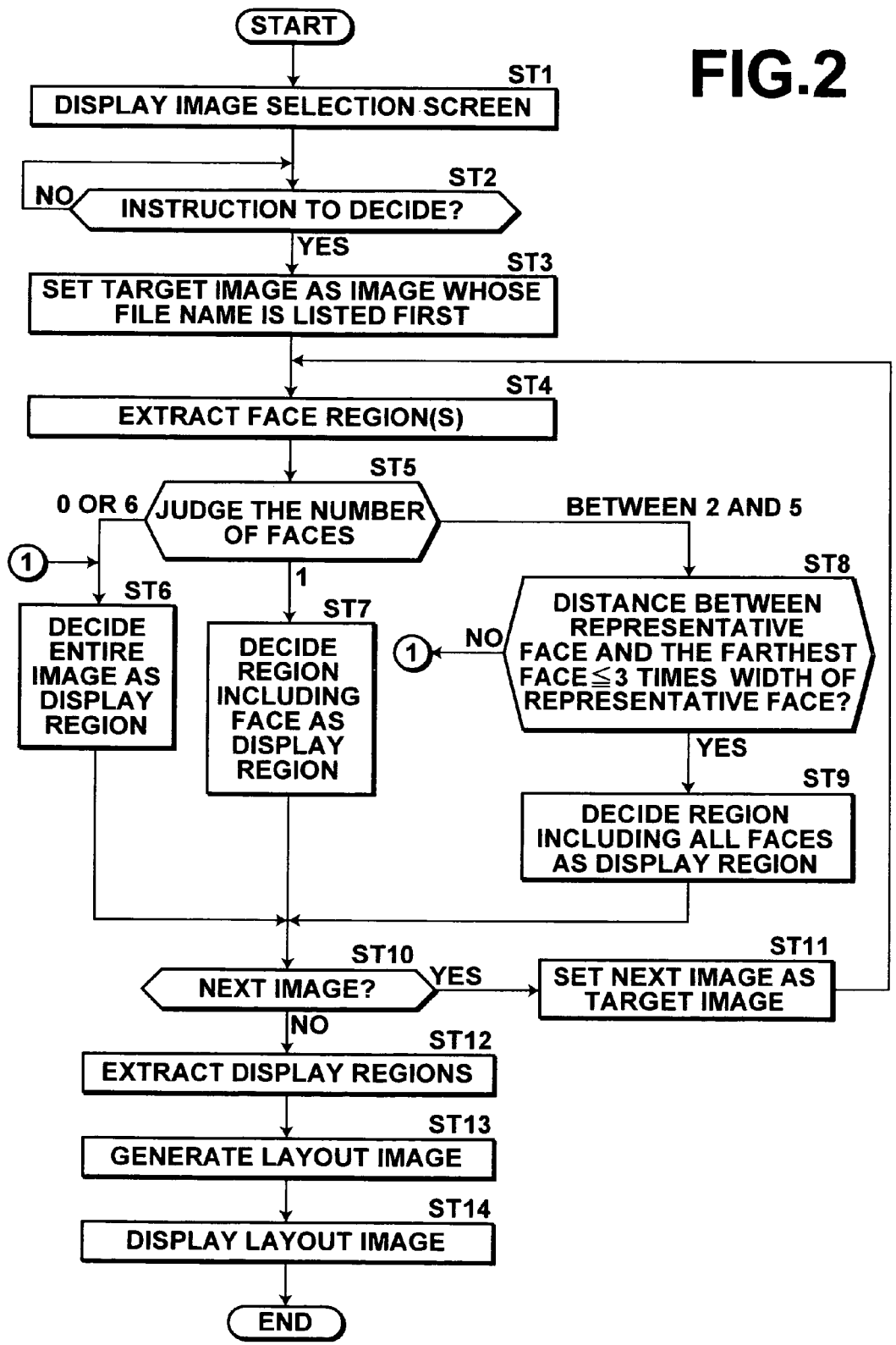
FIG. 2 is a flow chart showing procedures carried out in the embodiment.
Figure 3:
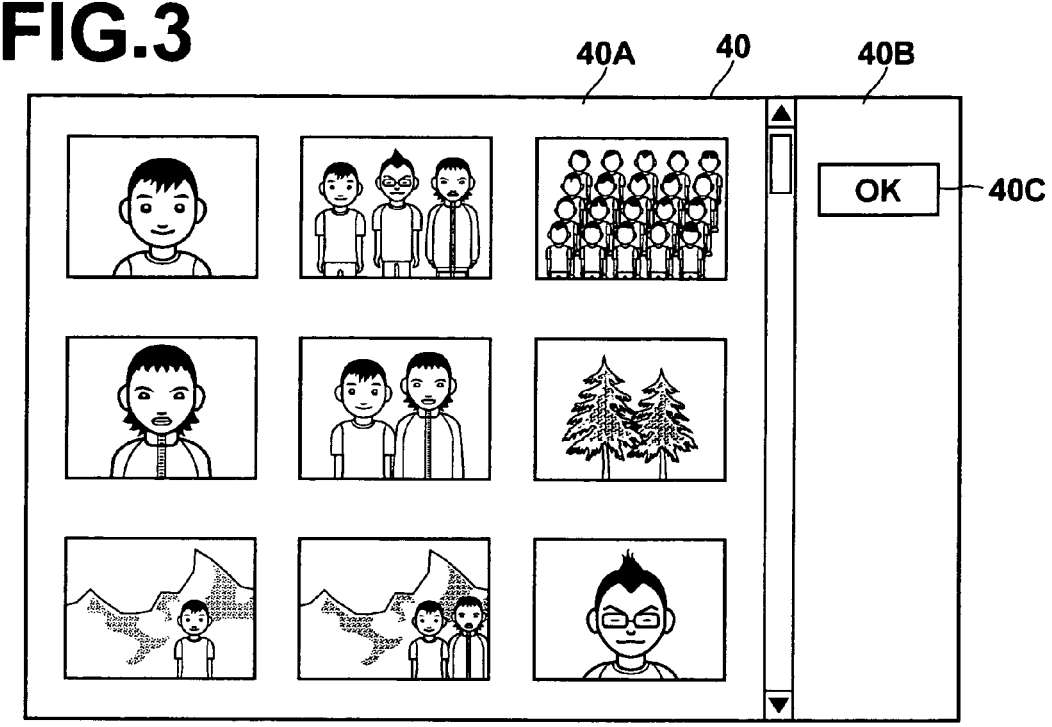
FIG. 3 shows an image selection screen.

FIG. 2 is a flow chart showing a flow of the procedures carried out in this embodiment. The CPU 12 starts the procedures in response to an image layout instruction input by a user from the input unit 16, and displays on the display unit 18 an image selection screen including a catalog of thumbnail images regarding images stored in the hard disc 24 (Step ST1). FIG. 3 shows an example of the image selection screen. As shown in FIG. 3, a thumbnail image area 40A showing the catalog of the thumbnail images is displayed in an image selection screen 40, together with an input area 40B used for various kinds of input. An OK button 40C is also displayed in the input area 40B for confirming the images to be laid out.

In the image selection area 40A, the user can select the images to be laid out, while using the input unit 16. More specifically, the user can select the images by clicking the images he/she wishes to lay out, in the thumbnail image area 40A. In this embodiment, a template used as the background of the layout image has been prepared. The user selects the images corresponding to the number of image insertion regions in the template, in the image selection screen 40.

Figure 4:
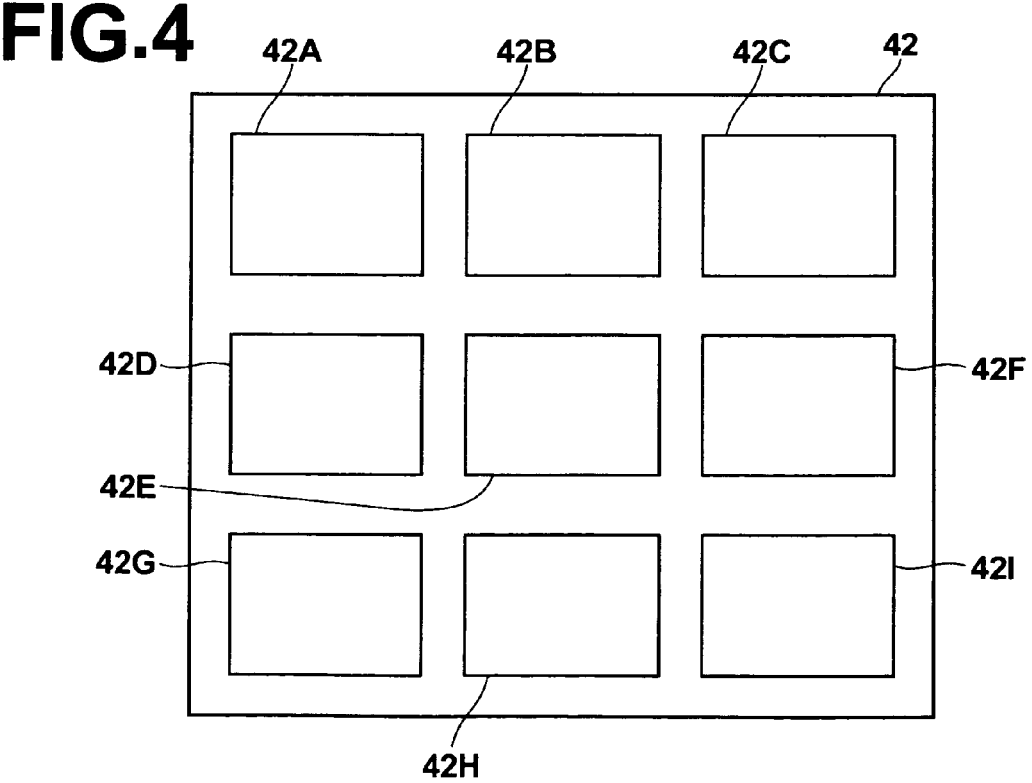
FIG. 4 shows an example of a template.

FIG. 4 shows an example of the template used as an image of the background of the layout image. As shown in FIG. 4, the template has nine image insertion regions 42A~42I having the same aspect ratio as an L-size print.

Monitoring is started as to whether the user has instructed to decide the images by clicking the OK button 40C (Step ST2). If a result at Step ST2 is affirmative, the region decision means 32 sets one of the images decided by the user, such as the image listed first when the images are sorted in order of file names, as a target image to be processed (Step ST3). A face region or face regions is/are then extracted from the target image (Step ST4). As a method of face region extraction can be used a method wherein a region of skin color having a shape of human face (such as an oval shape) is detected and extracted as the face region. In addition, any known methods such as methods described in Japanese Unexamined Patent Publications No. 8 (1996)-153187, 9 (1997)-050528, 2001-014474, 2001-175868, and 2001-209795 can be used.

The region decision means 32 then judges the number of faces having been extracted (Step ST5). In the case where no face is included in the target image, that is, the case where the number of faces is 0, the entire target image is decided as the display region (Step ST6). In the case where the number of faces is 6 or more, the flow of the procedures also goes to Step ST6. An image including 6 or more faces is often an image of class photograph. Therefore, the atmosphere at the time of photography is not ruined by using the entire image as the display region rather than extraction of only the faces from the image.

Figure 5:
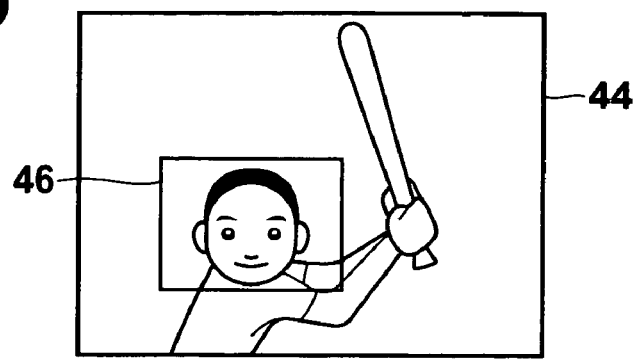
FIG. 5 shows how a display region is decided in the case where the number of faces is 1.

In the case where the number of faces is 1, a region that is appropriate for the aspect ratio of the corresponding image insertion region and includes the face is extracted as the display region (Step ST7). FIG. 5 shows how the display region is decided in the case where the number of faces is 1. In the case where the number of faces is 1 as in FIG. 5, a region 46 is decided as the display region, having the aspect ratio of the image insertion region (the aspect ratio of an L-size print in this embodiment) and including the face at the center of a target image 44. The upper and lower ends of the face in the region 46 are spaced from the upper and lower sides of the region 46 by a predetermined width.

In the case where the number of faces is between 2 and 5, the face having the largest face region is used as a representative face, and judgment is made as to whether a distance from the center (such as the position of nose) of the representative face to the center of the face farthest from the representative face is within 3 times the width of the representative face (Step ST8). In the case where a result at Step ST8 is affirmative, a region is decided as the display region, including all the faces and appropriate for the aspect ratio of the corresponding image insertion region in which the target image is inserted (Step ST9). If the result at Step ST8 is negative, the flow of the procedures goes to Step ST6 whereat the entire image is decided as the display region.

Figure 6A:
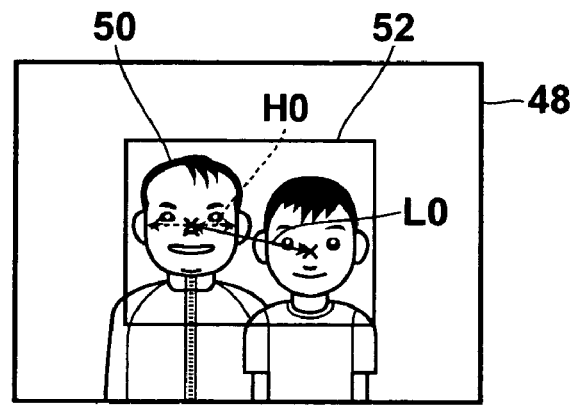
FIGS. 6A and 6B show how display regions are decided in the cases where the number of faces is between 2 and 5.
Figure 6B:
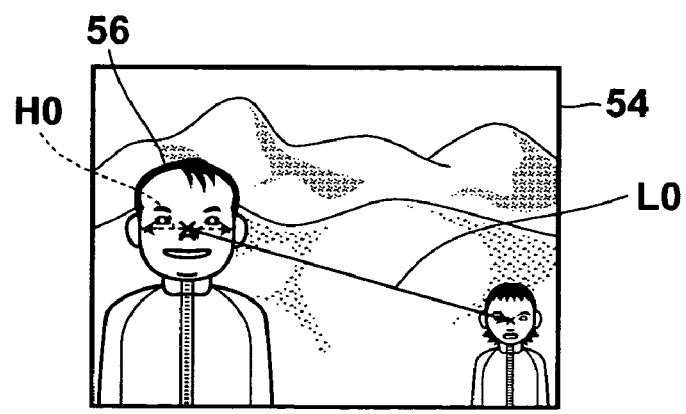

FIGS. 6A and 6B show how the display region is decided in the cases where the number of faces is between 2 and 5. In these examples, the number of faces is 2 in the target image. As shown in FIG. 6A, in the case where the two faces of a child and a parent are included in a target image 48, the face of the parent is larger than the face of the child. Therefore, the face of the parent is used as a representative face 50. In this case, if a distance L0 between the center of the face of the parent and the center of the face of the child is compared to a width H0 of the face of the parent, the length L0 is not larger than 3 times the width H0, since the parent is at close distance to the child. In this case, a region 52 having the faces of the parent and the child and having the aspect ratio of the image insertion region (the aspect ratio of an L-size print) is decided as the display region. The upper end of the uppermost face and the lower end of the lowermost face are respectively spaced by a predetermined width from the upper and lower sides of the image display region 52.

Meanwhile, as shown by a target image 54 in FIG. 6B, in the case where an image includes two persons but a main subject was the person on the left while the person on the right was included accidentally, the face of the left person appears large. Therefore, the face on the left is used as a representative face 56. In this case, if the distance L0 from the center of the left face to the center of the right face is compared to the width H0 of the left face, the distance L0 is larger than 3 times the width H0, since the right person was included unexpectedly in the image. Therefore, the right person is regarded as a part of the background, and the flow of the procedures goes to Step ST6 whereat the entire target image 54 is decided to be the display region.

In this embodiment, judgment is made as to whether the distance between the center of the representative face and the center of the farthest face is within 3 times the width of the representative face. However, this judgment criterion is not necessarily used. The number can be set appropriately to multiply the width of the representative face, for comparison with the distance between the center of the representative face and the center of the farthest face.

Thereafter, judgment is made on presence of a subsequent image to be processed (Step ST10). If a result at Step ST10 is affirmative, the subsequent image is used as the target image (Step ST11), and the procedures from Step ST4 are then repeated.

If the result at Step ST10 is negative, the layout image generation unit 34 extracts the display regions having been decided from the corresponding images (Step ST12). In the case where the display region has been decided to be the entity of the corresponding image, the entire image is extracted as the display region. The layout image is then generated by laying out the extracted display regions in the background image shown as the template (Step ST13) In generation of the layout image, the layout image generation unit 34 manipulates the extracted display regions to be suitable for the size and shape of the image insertion regions. The layout image is displayed on the display unit 18 (Step ST14) to end the procedures. The layout image may be printed by the printer 3.

Figure 7:
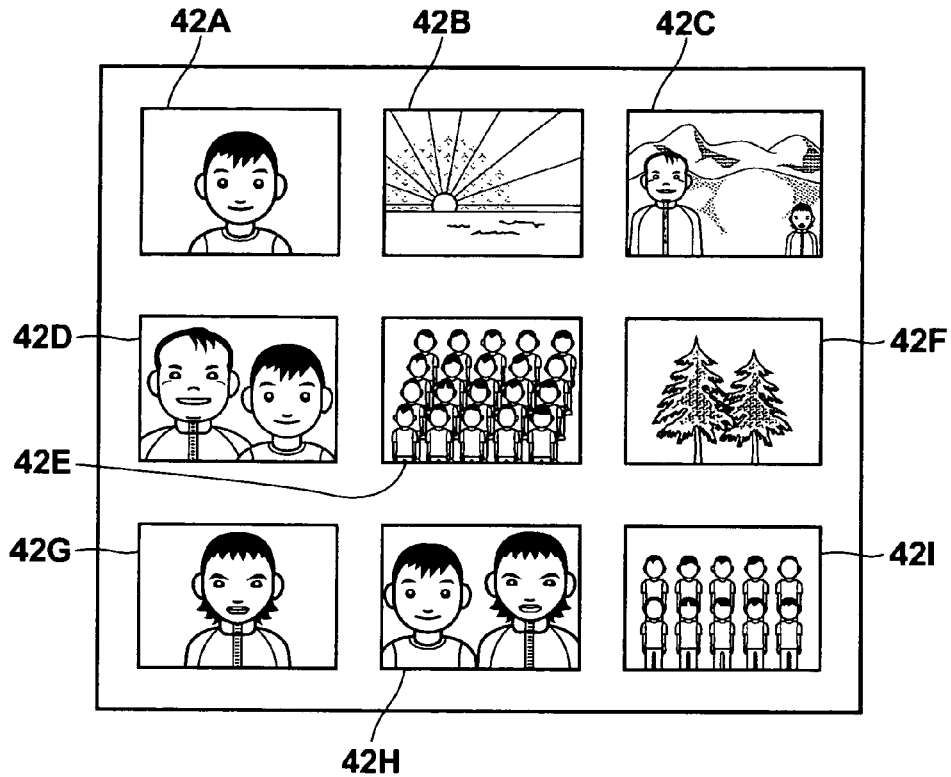
FIG. 7 shows an example of a layout image.

FIG. 7 shows an example of the layout image. The layout image shown in FIG. 7 is generated by inserting the extracted display regions in the image insertion regions 42A~42I of the template shown in FIG. 4. For example, the image insertion region 42C has the image whose display region is the entirety thereof, as shown in FIG. 6B. The image insertion regions 42E and 42I respectively have the images whose display regions are the entire images due to inclusion of 6 or more faces therein. In the image insertion regions 42B and 42F, the images whose display regions are the entire images are inserted, since the images do not include any face. In the image insertion regions 42A, 42D, 42G, and 42H, the images whose display regions are the regions including the faces therein are inserted.

As has been described above, in this embodiment, the display region of the predetermined range including at least one face in the corresponding image is decided according to the number of faces in the image and according to the distance between the faces in the case where the number of faces is larger than 1. The decided display region is extracted from the image, and the region is laid out in the background image for generating the layout image. Therefore, the region corresponding to the number of faces in the image can be extracted as the display region, and the layout image can be generated in appropriate layout according to the number of faces.

Figure 8:
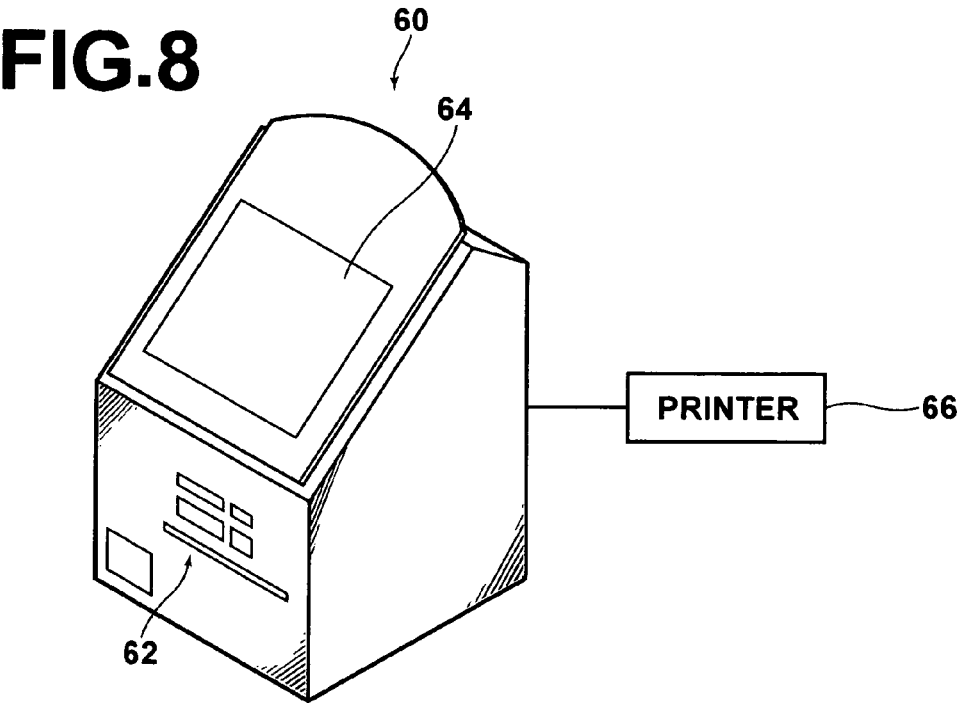
FIG. 8 shows an order reception apparatus adopting the image layout apparatus of the present invention.

In the embodiment described above, the image layout apparatus 1 of the present invention is used alone. However, as shown in FIG. 8, the image layout apparatus 1 of the present invention can be applied to an order reception apparatus 10 installed in a DPE store. In this case, a user inserts a memory card storing images in a memory card slot 62 of the order reception apparatus 60, and decides images to be laid out from the images stored in the memory card. A monitor 64 of the order reception apparatus 60 has a touch-panel input unit so that various instructions such as image selection can be input by touching the monitor 64.

In this manner, the order reception apparatus 60 generates a layout image in the same manner as the embodiment described above, and displays the layout image on the monitor 64. The user can print the layout image from a printer 66 of the DPE store connected to the order reception apparatus 60, by instructing the order reception apparatus 60 to carry out the printing.

In the embodiment described above, the entire target image is decided to be the display region at Step ST6 in the case where the result at Step ST8 has been negative. However, the display region may be decided to be a region that includes the representative face and is appropriate for the aspect ratio of the corresponding image insertion region in which the target image is inserted.

Although the apparatus related to the embodiment of the present invention has been described above, a program causing a computer to function as means corresponding the region decision means 32 and the layout image generation unit 34 and to carry out the procedures shown in FIG. 2 is also an embodiment of the present invention. Furthermore, a computer-readable recording medium storing the program is also an embodiment of the present invention.

What is claimed is:

1. An image layout apparatus comprising:
    image decision means for deciding a plurality of images selected to be laid out on one background image;
    region decision means for judging presence of at least one face in each of the plurality of selected images and for deciding a representative face of a plurality of faces with respect to an image that has been judged to include the at least one face, and that includes faces the number of which is greater than or equal to 2 and less than or equal to a predetermined number and for judging whether a distance between a center of the representative face and a center of a face other than the representative face is less than or equal to a predetermined number of times wider than the width of the representative face and for deciding, as a display region, a region including all of the faces if the judgment about the distance is YES and for deciding, as the display region, a whole area of the image if the judgment about the distance is NO; and layout image generation means for extracting the decided display region from the plurality of selected images respectively and for generating a layout image by laying out the plurality of extracted display regions on the background image.

2. The image layout apparatus according to claim 1, wherein, in the case where the background image has a plurality of image insertion regions of various sizes and shapes, the layout image generation means generates the layout image through manipulation of the display regions according to the sizes and the shapes of the corresponding image insertion regions in which the images are inserted.

3. The image layout apparatus according to claim 1, wherein the region decision means decides the entirety of each image not showing the presence of face among the images as the display region.

4. The image layout apparatus according to claim 1, wherein the region decision means decides the entirety of an image showing the presence of face among the images as the display, region in the case where the number of the faces therein is a predetermined number or larger.

5. The image layout apparatus according to claim 1, wherein, in the case where the number of the faces is 1 for an image showing the presence of face among the images, the region decision means decides a region including the face and appropriate for an aspect ratio of a corresponding image insertion region in the background image as the display region.

6. The image layout apparatus according to claim 1, wherein, in the case where the number of the faces is between 2 and a predetermined number for an image showing the presence of face among the images, the region decision means decides the largest face as a representative face;

carries out judgment as to whether a distance between a center of the representative face and a center of the face farthest from the representative face is within a predetermined number of times a width of the representative face; and decides a region including all the faces and appropriate for an aspect ratio of a corresponding image insertion region in the background image as the display region in the case where a result of the judgment is affirmative.

7. The image layout apparatus according to claim 6, wherein the region decision means decides the entirety of the image as the display region in the case where the result of the judgment is negative.

8. An image layout method comprising the steps of:

deciding a plurality of images selected to be laid out on one background image;

judging using a region decision unit the presence of at least one face in each of the plurality of selected images and deciding a representative face of a plurality of faces with respect to an image that has been judged to include the at least one face, and that includes faces the number of which is greater than or equal to 2 and less than or equal to a predetermined number and for judging whether a distance between a center of the representative face and a center of a face other than the representative face is less than or equal to a predetermined number of times wider than the width of the representative face and for deciding, as a display region, a region including all of the faces if the judgment about the distance is YES and for deciding, as the display region, a whole area of the image if the judgment about the distance is NO; and extracting using a layout generation unit the decided display region from the plurality of selected images respectively and generating a layout image by laying out the plurality of extracted display regions on the background image.

9. A non-transitory computer readable storage medium encoded with computer executable instructions for causing a computer to execute an image layout method comprising the procedures of:

deciding a plurality of images selected to be laid out on one background image;

judging using a region decision unit the presence of at least one face in each of the plurality of selected images and deciding a representative face of a plurality of faces with respect to an image that has been judged to include the at least one face, and that includes faces the number of which is greater than or equal to 2 and less than or equal to a predetermined number and for judging whether a distance between a center of the representative face and a center of a face other than the representative face is less than or equal to a predetermined number of times wider than the width of the representative face and for deciding, as a display region, a region including all of the faces if the judgment about the distance is YES and for deciding, as the display region, a whole area of the image if the judgment about the distance is NO; and extracting using a layout generation unit the decided display region from the plurality of selected images respectively and generating a layout image by laying out the plurality of extracted display regions on the background image.

10. An image layout apparatus as defined in claim 1, wherein the region decision means decides, as the display region, a predetermined range of the region including the face with respect to the image including one face.

11. An image layout apparatus as defined in claim 1, wherein the region decision means decides, as the display region, the whole area of the image with respect to the image including faces the number of which is greater than the predetermined number.

* * * * *